(12) United States Patent
Yamaguchi et al.

(10) Patent No.: US 7,754,389 B2
(45) Date of Patent: Jul. 13, 2010

(54) BATTERY INCLUDING AN ELECTROLYTE SOLUTION COMPRISING A HALOGENATED CARBONATE DERIVATIVE

(75) Inventors: Akira Yamaguchi, Fukushima (JP); Kaoru Nakajima, Miyagi (JP); Yusuke Fujishige, Fukushima (JP); Yuzuru Fukushima, Miyagi (JP); Masayuki Nagamine, Fukushima (JP)

(73) Assignee: Sony Corporation, Tokyo (JP)

( * ) Notice: Subject to any disclaimer, the term of this patent is extended or adjusted under 35 U.S.C. 154(b) by 1134 days.

(21) Appl. No.: 11/049,432

(22) Filed: Feb. 1, 2005

(65) Prior Publication Data

US 2005/0196670 A1    Sep. 8, 2005

(30) Foreign Application Priority Data

Feb. 12, 2004    (JP)    ............................. P2004-035294

(51) Int. Cl.
*H01M 6/16*    (2006.01)
*H01M 4/00*    (2006.01)

(52) U.S. Cl. ........................ 429/325; 429/324; 429/220

(58) Field of Classification Search .............. 429/218.1, 429/326, 324, 188
See application file for complete search history.

(56) References Cited

U.S. PATENT DOCUMENTS

| | | | |
|---|---|---|---|
| 4,950,566 A | 8/1990 | Huggins et al. | |
| 5,529,859 A | 6/1996 | Shu et al. | |
| 6,506,524 B1 * | 1/2003 | McMillan et al. | 429/324 |
| 7,074,523 B2 * | 7/2006 | Arai et al. | 429/326 |
| 7,172,834 B1 * | 2/2007 | Jow et al. | 429/188 |
| 2004/0034253 A1 | 2/2004 | Angell et al. | |
| 2004/0038133 A1 * | 2/2004 | Yamaguchi et al. | 429/326 |
| 2004/0043299 A1 | 3/2004 | Koike et al. | |
| 2004/0151987 A1 * | 8/2004 | Kawase et al. | 429/338 |
| 2004/0197667 A1 * | 10/2004 | Noh et al. | 429/326 |
| 2005/0214646 A1 | 9/2005 | Kubota | |

FOREIGN PATENT DOCUMENTS

EP    1 150 374    10/2001

(Continued)

OTHER PUBLICATIONS

Office Action issued by the Japanese Patent Office on Jun. 27, 2007 for corresponding Japanese Application No. 2004-035294.

(Continued)

*Primary Examiner*—Dah-Wei D Yuan
*Assistant Examiner*—Zachary Best
(74) *Attorney, Agent, or Firm*—K&L Gates LLP

(57) ABSTRACT

An electrolyte solution and a battery which are capable of improving cycle characteristics are provided. An anode includes a simple substance, an alloy or a compound of a metal element or a metalloid element capable of forming an alloy with lithium as an anode active material. A separator is impregnated with an electrolyte solution formed through dissolving an electrolyte salt in a solvent. The electrolyte salt includes a first electrolyte salt including $LiB(C_2O_4)_2$ and a second electrolyte salt including at least one kind selected from the group consisting of $LiPF_6$, $LiBF_4$, $LiN(CF_3SO_2)_2$, $LiN(C_2F_5SO_2)_2$, $LiClO_4$, $LiAsF_6$ and $LiC(CF_3SO_2)_3$. In the solvent, 4-fluoroethylene carbonate is included. A coating is formed on the anode by the first electrolyte salt, and high ionic conductivity can be obtained by the second electrolyte salt. Further an oxidation-decomposition reaction of the electrolyte solution which occurs in a cathode can be prevented by 4-fluoroethylene carbonate.

14 Claims, 4 Drawing Sheets

FOREIGN PATENT DOCUMENTS

| | | |
|---|---|---|
| EP | 1 463 143 | 9/2004 |
| JP | 06-325765 | 11/1994 |
| JP | 07-230800 | 8/1995 |
| JP | 10-154528 | 6/1998 |
| JP | 11-102705 | 4/1999 |
| JP | 2003-051336 | 2/2003 |
| JP | 2004-152753 | 5/2004 |
| WO | 02/068432 | 9/2002 |
| WO | 03/075371 | 9/2003 |

OTHER PUBLICATIONS

M.C. Smart et al.: Improved performance of lithium-ion cells with the use of flyorinated carbonate-based electrolytes: Journal of Power Sources, vol. 119-121, Jun. 1, 2003, pp. 359-367.

R. McMillian et al.: "Flouoroethylene carbonate electrolyte and its use in lithium ion batteries with graphite anodes" Journal of Power Sources, vol. 81-82, Sep. 1999, pp. 20-26.

T.R. Jow et al.: "Nonaqueous electrolytes for wide-temperature-range operation of Li-ion cells" Journal of Power Sources, vol. 119-121, Jun. 1, 2003, pp. 343-348.

W. Xu et al.: "LIBOB and its Derivatives—Weakly Coordinating Anions, and the Exceptional Conductivity of their Nonaqueous Solutions" Electrochemical and Solid-State Letters, vol. 4, No. 1, Jan. 2001, pp. E01-E04.

Z.X. Shu et al.: "Use of Chlorethyiene Carbonate as an Electrolyte Solvent for a Graphite Anode in a Lithium-Ion Battery" Journal of the Electrochemical Society, vol, 143, No. 7, Jul. 1996, pp. 2230-2235.

* cited by examiner

BATTERY INCLUDING AN ELECTROLYTE SOLUTION COMPRISING A HALOGENATED CARBONATE DERIVATIVE

CROSS REFERENCE TO RELATED APPLICATIONS

The present application claims priority to Japanese Patent Document No. P2004-035294 filed on Feb. 12, 2004, the disclosure of which is herein incorporated by reference.

BACKGROUND OF THE INVENTION

The present invention relates to an electrolyte solution and a battery using the electrolyte solution, and more specifically an electrolyte solution and a battery which are effective with respect to, for example, simple substances, alloys and compounds of metal elements and metalloid elements is used as an anode active material.

A development of batteries with a high energy density has been required in accordance with downsizing of electronic devices. As a battery which meets the requirement, a lithium secondary battery is cited. However, in the lithium secondary battery, during charge, lithium (Li) is deposited on an anode to form a dendrite, thereby lithium is inactivated, so a problem that the cycle life of the lithium secondary battery is short arises.

As a battery with an improved cycle life, a lithium-ion secondary battery is commercially available. In an anode of the lithium-ion secondary battery, an anode active material such as a graphite material using an intercalation reaction of lithium between graphite layers, or a carbonaceous material using an application of insertion and extraction of lithium in pores is used. Therefore, in the lithium-ion secondary battery, lithium is not deposited to form a dendrite, and its cycle life is longer. Moreover, the graphite material or the carbonaceous material is stable in air, so the lithium-ion secondary battery has a big advantage in industrial production.

However, an anode capacity by intercalation has an upper limit stipulated by the composition $C_6Li$ of a first stage graphite intercalation compound. Moreover, it is industrially difficult to control a minute pore structure of the carbonaceous material, and the specific gravity of the carbonaceous material declines, so using the carbonaceous material cannot be an effective means of improving the anode capacity per unit volume and by extension to a battery capacity per unit volume. It is known that some low-temperature fired carbonaceous materials exhibit an anode discharge capacity exceeding 1000 mAh/g; however, there is a problem that when the battery comprises a metal oxide or the like as a cathode, discharge voltage declines, because the metal oxide has a large capacity at a noble potential of 0.8 V or more against lithium metal.

Because of these problems, it is considered that it is difficult for existing carbonaceous materials to meet a demand for a longer operating time of electronic devices in future or a higher energy density of power sources. Therefore, an anode active material having superior capability to insert and extract lithium is required.

On the other hand, as an anode active material capable of achieving a higher capacity, a material to which a fact that some kinds of lithium alloys are electrochemically and reversibly produced and decomposed is applied has been widely researched. For example, a lithium-aluminum alloy has been widely researched, and in U.S. Pat. No. 4,950,566, a silicon alloy has been reported. However, when these alloys are used for an anode of a battery, cycle characteristics will decline. One of the reasons is that these alloys expand and shrink according to charge and discharge, thereby the alloys are pulverized every time charge and discharge are repeated.

Therefore, in order to prevent the pulverization of such an alloy, for example, it is considered that an element not involved in expansion and shrinkage according to insertion and extraction of lithium is substituted for a part of the alloy. For example, $LiSi_aO_b$ ($0 \leq a$, $0 < b < 2$) (refer to Japanese Unexamined Patent Application publication No. Hei 6-325765), $Li_cSi_{1-d}M_dO_e$ where M is a metal element except for alkali metal or a metalloid element except for silicon; $0 \leq c$; $0 < d < 1$; and $0 < e < 2$ (refer to Japanese Unexamined Patent Application Publication No. Hei 7-230800), a lithium-aluminum-tellurium alloy (refer to Japanese Unexamined Patent Application Publication No. 7-288130) and the like have been proposed. Further, a compound including one or more kinds of non-metal elements and a Group 14 metal element or a Group 14 metalloid element in the long form of the periodic table of the elements (refer to Japanese Unexamined Patent Application Publication No. Hei 11-102705) has been proposed.

However, the fact is that even if these anode active materials are used, a decline in cycle characteristics due to expansion and shrinkage is large, so a characteristic of a high capacity cannot be exploited.

SUMMARY OF THE INVENTION

The present invention relates to an electrolyte solution and a battery using the electrolyte solution, and more specifically an electrolyte solution and a battery which are effective with respect to, for example, simple substances, alloys and compounds of metal elements and metalloid elements is used as an anode active material.

In an embodiment, the present invention provides a battery capable of improving battery characteristics such as cycle characteristics, and an electrolyte solution used in the battery.

An electrolyte solution according to an embodiment of the present invention includes: a solvent including a carbonate derivative containing a halogen atom, a first anion represented by Chemical Formula 1 as detailed below; and a second anion except for the first anion:

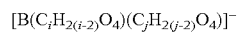  Chemical Formula 1 where i and j are integers of 2 or more.

A battery according to an embodiment of the present invention includes: a cathode; an anode; and an electrolyte solution, wherein the electrolyte solution includes: a solvent including a carbonate derivative containing a halogen atom; a first anion represented by Chemical Formula 2 as detailed below; and a second anion except for the first anion:

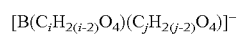  Chemical Formula 2 where i and j are integers of 2 or more.

In the electrolyte solution according to an embodiment of the present invention, the carbonate derivative containing a halogen atom, the first anion and the second anion are included, so when the electrolyte solution is used in, for example, a battery, while maintaining high ionic conductivity, a stable coating is formed on the anode so that an irreversible reaction which occurs between the anode and the electrolyte solution can be prevented, and an oxidation-decomposition reaction of the electrolyte solution which occurs in the cathode can be prevented. Therefore, battery characteristics such as cycle characteristics and low temperature characteristics can be improved.

In particular, when the content of the carbonate derivative containing a halogen atom in the solvent is within a range of 0.1 vol % to 65 vol % inclusive, or when the content of the first anion in the electrolyte solution is within a range of 0.01 mol/l to less than 0.5 mol/l, higher effects can be obtained.

Additional features and advantages of the present invention are described in, and will be apparent from, the following Detailed Description of the Invention and the figures.

DETAILED DESCRIPTION OF THE INVENTION

The present invention relates to an electrolyte solution and a battery using the electrolyte solution, and more specifically an electrolyte solution and a battery which are effective with respect to, for example, simple substances, alloys and compounds of metal elements and metalloid elements is used as an anode active material.

A preferred embodiment of the invention will be described in more detail below referring to the accompanying drawings.

Figure 1:
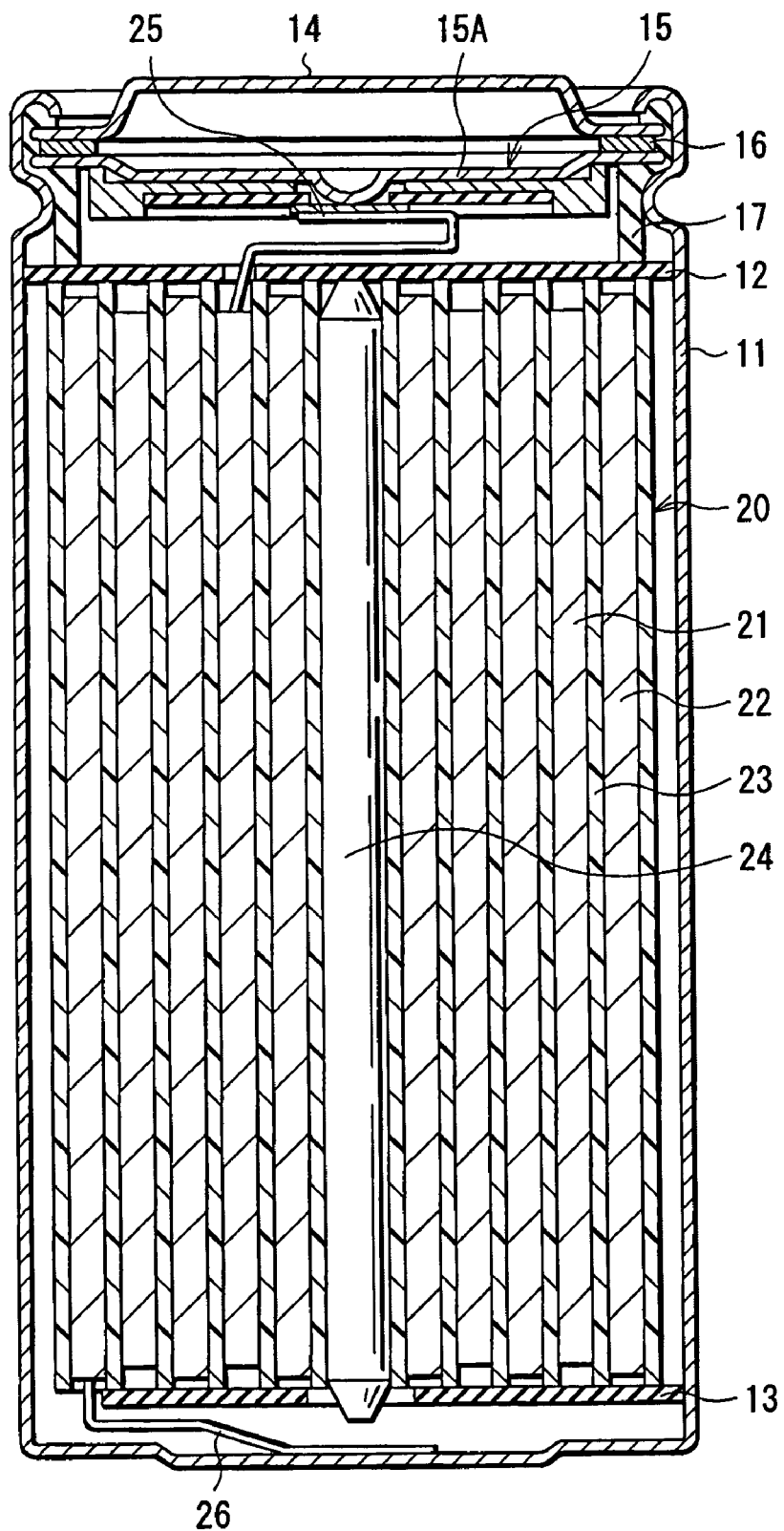
FIG. 1 is a sectional view of a secondary battery according to an embodiment of the invention.

FIG. 1 shows a sectional view of a secondary battery according to an embodiment of the invention. The secondary battery is a so-called cylindrical battery, and includes a spirally wound electrode body 20 in which a strip-shaped cathode 21 and a strip-shaped anode 22 are spirally wound with a separator 23 in between in a substantially hollow cylindrical-shaped battery can 11. The battery can 11 is made of, for example, nickel (Ni)-plated iron (Fe). An end portion of the battery can 11 is closed, and the other end portion thereof is opened. In the battery can 11, a pair of insulating plates 12 and 13 are disposed such that the spirally wound electrode body 20 is sandwiched therebetween in a direction perpendicular to a peripheral winding surface.

In the opened end portion of the battery can 11, a battery cover 14 and, a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the positive temperature coefficient device 16, and when internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the positive temperature coefficient device 16 limits a current by an increased resistance to prevent abnormal heat generation by a large current. The gasket 17 is made of, for example, an insulating material, and its surface is coated with asphalt.

For example, the spirally wound electrode body 20 is spirally wound, and a center pin 24 is inserted into the center of the spirally wound electrode body 20. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
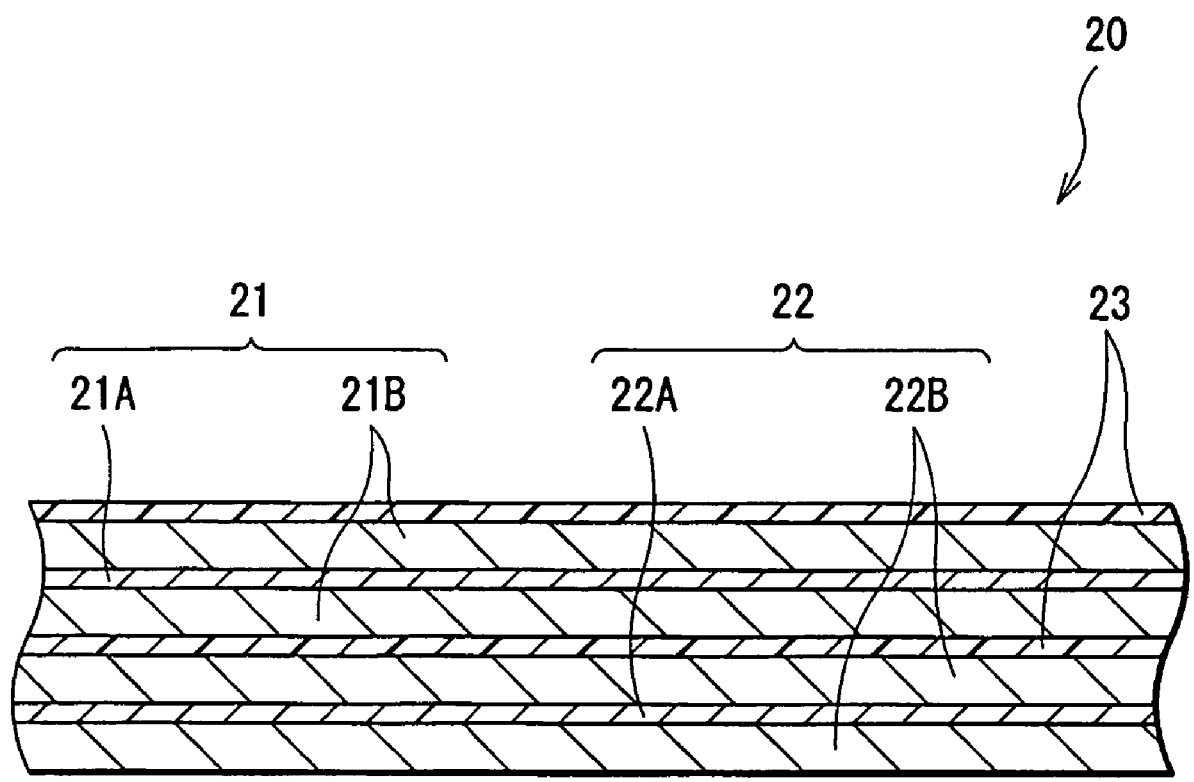
FIG. 2 is an enlarged sectional view of a part of a spirally wound electrode body in the secondary battery shown in FIG. 1.

FIG. 2 shows an enlarged view of a part of the spirally wound electrode body 20 shown in FIG. 1. The cathode 21 has, for example, a structure in which a cathode active material layer 21B is disposed on both sides of a cathode current collector 21A having a pair of facing surfaces. The cathode active material layer 21B may be disposed only on either side of the cathode current collector 21A, although it is not shown. The cathode current collector 21A is made of, for example, metal foil such as aluminum foil, nickel foil or stainless foil.

The cathode active material layer 21B includes, for example, one kind or two or more kinds of cathode materials capable of inserting and extracting lithium as an electrode reacting material as a cathode active material, and may include an electrical conductor and a binder, if necessary. In other words, the capacity of the cathode 21 includes a capacity component by insertion and extraction of lithium as an electrode reacting material. Examples of the cathode material capable of inserting and extracting lithium include metal sulfides, metal selenides and metal oxides which include no lithium such as titanium sulfide ($TiS_2$), molybdenum sulfide ($MOS_2$), niobium selenide ($NbSe_2$) and vanadium oxide ($V_2O_5$), and lithium-containing compounds.

Among them, the lithium-containing compounds are preferable, because some lithium-containing compounds can obtain a high voltage and a high energy density. Examples of such lithium-containing compounds include compounds represented by chemical formulas $Li_xMIO_2$ and $Li_yMIIPO_4$. In the formulas, MI and MII represent one or more kinds of transition metals, and more specifically, each of MI and MII preferably includes at least one kind selected from the group consisting of cobalt (Co), nickel and manganese (Mn), because a higher voltage can be obtained. In the formulas, the values of x and y depend upon a charge-discharge state of the battery, and are generally within a range of $0.05 \leq x \leq 1.10$ and $0.05 \leq y \leq 1.10$, respectively. Specific examples of the lithium-containing compound represented by the chemical formula $Li_xMIO_2$ include lithium cobalt complex oxide ($LiCoO_2$), lithium nickel complex oxide ($LiNiO_2$), lithium nickel cobalt complex oxide ($Li_zNi_vCo_{1-v}O_2$ (in the formula, the values of z and v depend upon a charge-discharge state of the battery, and are generally within a range of $0<z<1$ and $0.7<v<1.02$, respectively)), lithium manganese complex oxide ($LiMn_2O_4$) having a spinel structure and the like.

The anode 22 has, for example, a structure in which an anode active material layer 22B is disposed on both sides of an anode current collector 22A having a pair of facing surfaces. The anode active material layer 22B may be disposed only on either side of the anode current collector 22A, although it is not shown. The anode current collector 22A is made of, for example, metal foil such as copper (Cu) foil, nickel foil or stainless foil.

For example, the anode active material layer 22B preferably includes simple substances, alloys and compounds of metal elements capable of inserting and extracting lithium and simple substances, alloys and compounds of metalloid elements capable of inserting and extracting lithium as an anode active material, the like, and combinations thereof. In other words, the capacity of the anode 22 preferably includes a capacity component by insertion and extraction of lithium as the electrode reacting material by the anode active material, because a higher capacity can be obtained. In the description, the alloy include an alloy including one or more kinds of metal elements and one or more kinds of metalloid elements in addition to an alloy including two or more kinds of metal elements. As the composition of the alloy, a solid solution, a eutectic (eutectic mixture), an intermetallic compound or the coexistence of two or more kinds selected from them is cited.

Examples of the metal elements or the metalloid elements capable of inserting and extracting lithium include magnesium (Mg), boron (B), aluminum, gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr) and yttrium (Y). Examples of alloys and compounds include alloys and compounds represented by a chemical formula $Ma_sMb_t$. In the chemical formula, Ma represents at least one kind selected from metal elements and metalloid elements capable of inserting and extracting lithium, and Mb represents at least one kind selected from elements except for Ma. Further, the values of s and t are s >0 and t≧0, respectively.

Among them, a Group 14 metal element or a Group 14 metalloid element in the long form of the periodic table of the elements, or an alloy thereof or a compound thereof is preferable, and silicon or tin, or an alloy thereof or a compound thereof is more preferable, because a higher capacity can be obtained. They may have a crystalline structure or an amorphous structure.

Specific examples of such an alloy or such a compound include an alloy or a compound represented by $McMd_u$ (Mc represents silicon or tin; Md represents one or more kinds of metal elements; and u≧0) such as $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$ or $ZnSi_2$, SiC, $Si_3N_4$, $Si_2N_2O$, $Ge_2N_2O$, $SiO_q$ (0<q≦2), $SnO_r$ (0<r≦2), LiSiO, LiSnO and the like.

Further, examples of other alloys and other compounds include a lithium-aluminum alloy, a LiAlMe alloy where Me represents at least one kind selected from the group consisting of elements in Groups 2 through 11 and elements in Group 14 in the long form of the periodic table of the elements, an aluminum-antimony alloy and a copper-magnesium-antimony alloy.

Such an alloy or such a compound can be obtained through, for example, a mechanical alloying method, or a method of heating a mixture including materials under an inert atmosphere or a reducing atmosphere.

The anode active material layer 22B may further include any other anode active material, a binder, an electrical conductor or any other material which does not contribute to charge. As the other anode active material, a carbon material capable of inserting and extracting lithium is cited. The carbon material has superior cycle characteristics, so the carbon material is preferably used together with one kind or two or more kinds, such as simple substances, alloys and compounds of metal elements and metalloid elements capable of inserting and extracting lithium, and the like because a higher capacity can be obtained, and cycle characteristics can be improved. Moreover, the carbon material is preferable, because the carbon material also acts as an electrical conductor. Examples of the carbon material include non-graphitizable carbon, graphitizable carbon, graphite, carbon black, carbon fiber, pyrolytic carbon and the like.

The separator 23 isolates between the cathode 21 and anode 22 so as to pass lithium ions through while preventing a short circuit of a current due to the contact between the cathode 21 and the anode 22. The separator 23 is made of, for example, a porous film of a synthetic resin such as polytetrafluoroethylene, polypropylene or polyethylene, or a porous film of an inorganic material such as nonwoven fabric of ceramic, and the separator 23 may have a structure in which two or more kinds of the porous films are laminated.

The separator 23 is impregnated with an electrolyte solution which is a liquid electrolyte. The electrolyte solution includes, for example, an electrolyte salt and a solvent such as an organic solvent in which the electrolyte salt is dissolved.

The electrolyte salt includes a first electrolyte salt including at least one kind selected from metal salts with a structure represented by Chemical Formula 3 as shown below, and at least one kind selected from second electrolyte salts. Examples of the second electrolyte salts include a metal salt with a structure represented by $PF_6$, a metal salt with a structure represented by $BF_4$, a metal salt with a structure represented by $ClO_4$, a metal salt with a structure represented by $AsF_6$, a metal salt with a structure represented by Chemical Formula 4 as shown below, and a metal salt with a structure represented by Chemical Formula 5 as shown below. At least a part of the electrolyte salt is ionized in the electrolyte solution. In other words, the electrolyte solution includes a first anion represented by $[B(C_iH_{2(i-2)}O_4)(C_jH_{2(j-2)}O_4)]^-$, at least one kind of second anion, such as anions represented by, for example, $PF_6^-$, $BF_4^-$, $ClO_4^-$, $AsF_6^-$, $[N(C_mF_{2m+1}SO_2)(C_nF_{2n+1}SO_2)]^-$, and $[C((C_pF_{2p+1}SO_2)(C_qF_{2q+1}SO_2)]^-$.

Chemical Formula 3:

where i and j are integers of 2 or more.

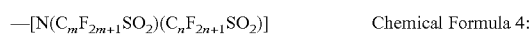

Chemical Formula 4:

where m and n are integers of 1 or more.

Chemical Formula 5:

where p, q and r are integers of 1 or more.

Thereby, in the secondary battery, the cycle characteristics can be improved, and the ionic conductivity can be increased. As the first anion is included, a stable coating is formed on the anode 22 so that an irreversible reaction which occurs between the anode 22 and the electrolyte solution can be prevented. Further, when only the first anion is included, sufficient ionic conductivity cannot be obtained, so it is considered that when the second anion is included together with the first anion, the ionic conductivity can be increased.

As the electrolyte salt, a lithium salt is preferably but not necessarily used, and any other metal salt such as a sodium salt, a potassium salt, a magnesium salt, a calcium salt, or an aluminum salt may be used, because lithium which contributes to a charge-discharge reaction may be supplied from the cathode 21.

In the first anion, i and j in Chemical Formula 3 are preferably integers of 7 or less, and more preferably integers of 6 or less. It is because when the first anion with a molecular weight exceeding the above range is used, the viscosity of the electrolyte solution becomes higher, so the ionic conductivity may decline. More specifically, as the first anion, $B(C_2O_4)_2^-$ represented by a structural formula shown in Chemical Formula 6 as shown below, $B(C_2O_4)(C_4H_4O_4)^-$ represented by a structural formula shown in Chemical Formula 7 as shown below, $B(C_3H_2O_4)(C_4H_4O_4)^-$ represented by a structural formula shown in Chemical Formula 8 as shown below, $B(C_4H_4O_4)_2^-$ represented by a structural formula shown in Chemical Formula 9 as shown below, $B(C_6H_8O_4)(C_7H_{10}O_4)^-$ represented by a structural formula shown in Chemical Formula 10 as shown below, $B(C_7H_{10}O_4)(C_8H_{12}O_4)^-$ represented by a structural formula shown in Chemical Formula 11 as shown below or the like is used, and among them, $B(C_2O_4)_2^-$ is preferable.

Chemical Formula 6:

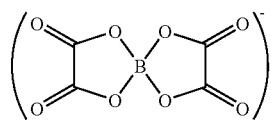

Chemical Formula 7:

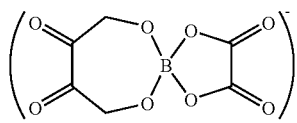

Chemical Formula 8:

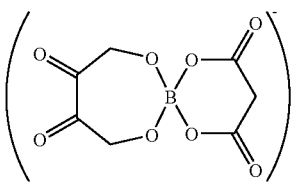

Chemical Formula 9:

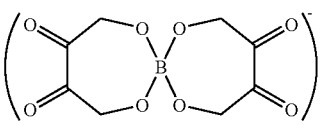

Chemical Formula 10:

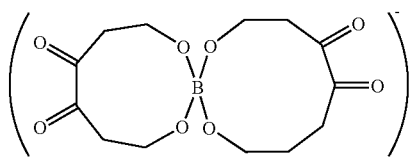

Chemical Formula 11:

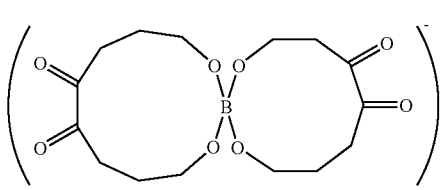

The content of the first electrolyte salt or the content of the first anion in the electrolyte solution is preferably within a range of 0.01 mol/l to less than 0.5 mol/l, and more preferably within a range of 0.05 mol/l to 0.45 mol/l inclusive. It is because when the content is too small, the thickness of the coating formed on the anode 22 may not be sufficient, and when the content is too large, the thickness of the coating will be too thick, so the coating may interfere with an electrode reaction in the anode 22.

The electrolyte salt may include one kind or two or more kinds of third electrolyte salts in addition to the first electrolyte salt and the second electrolyte salt. Examples of the third electrolyte salt include a metal salt with a structure represented by $B(C_6H_5)_4$, a metal salt with a structure represented by $CH_3SO_3$, a metal salt with a structure represented by $CF_3SO_3$, a metal chloride and a metal bromide.

The solvent includes at least a carbonate derivative containing a halogen atom, because the oxidation potential of the electrolyte solution can be increased, and an oxidation-decomposition reaction of the electrolyte solution in the cathode 21 can be prevented. As the carbonate derivative containing a halogen atom, monofluoroethylene carbonate, monochloroethylene carbonate, monobromoethylene carbonate, difluoroethylene carbonate, 4-trifluoromethyl-1,3-dioxolane-2-one or the like is cited, and among them, 4-fluoroethylene carbonate (4-fluoro-1,3-dioxolane-2-one) shown in Chemical Formula 12 as shown below is preferable.

Chemical Formula 12:

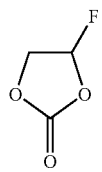

Figure 3:
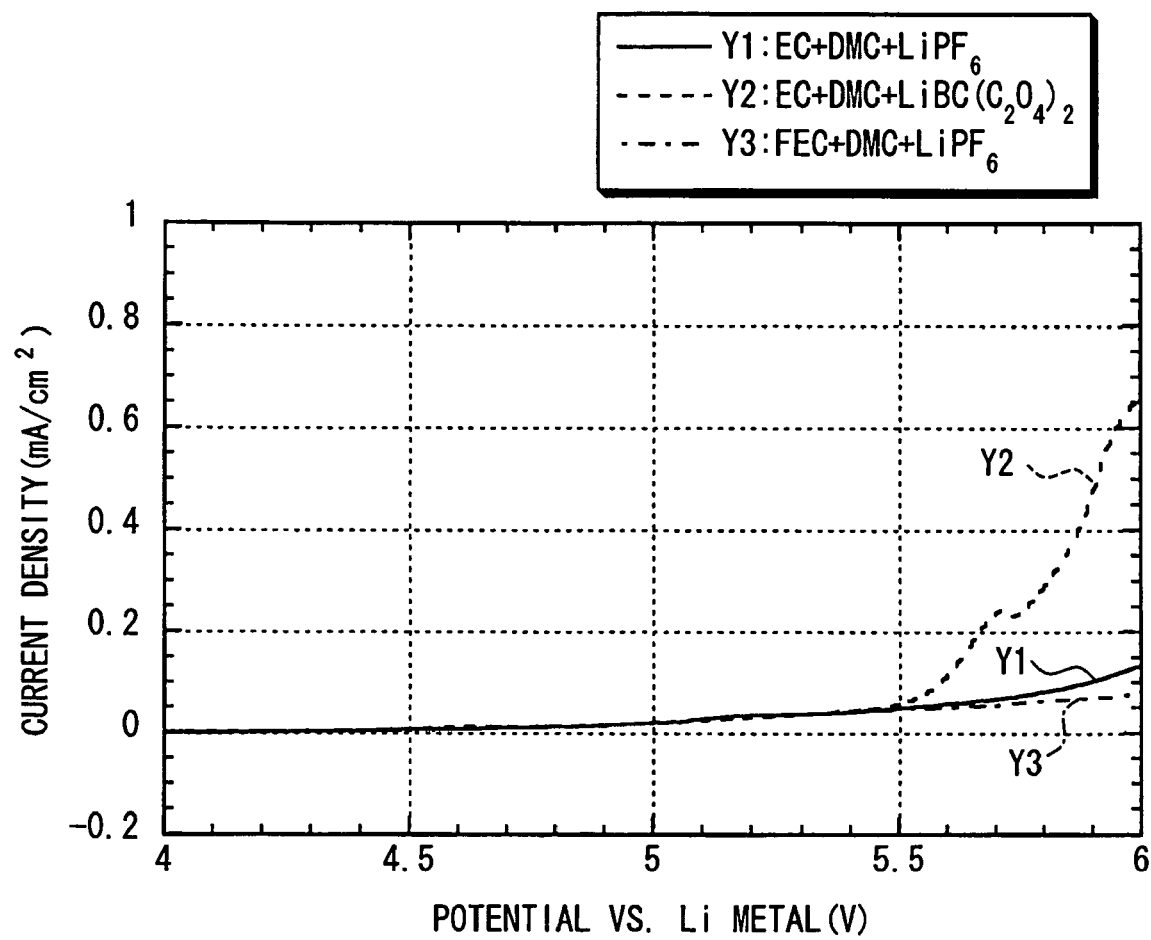
FIG. 3 is a plot showing current-potential curves for compositions of electrolyte solutions.

FIG. 3 shows results of the measurement of current-potential curves for different compositions of electrolyte solutions. In FIG. 3, Y1 is a current-potential curve for an electrolyte solution 1 formed through adding 1.0 mol/l of $LiPF_6$ to a mixed solvent including 75 vol % of ethylene carbonate (EC) and 25 vol % of dimethyl carbonate (DMC); Y2 is a current-potential curve for an electrolyte solution 2 formed through adding 1.0 mol/l of $LiB(C_2O_4)_2$ to a mixed solvent with the same composition as that of the electrolyte solution 1; and Y3 is a current-potential curve for an electrolyte solution 3 formed through adding 1.0 mol/l of $LiPF_6$ to a mixed solvent including 75 vol % of 4-fluoroethylene carbonate (FEC) and 25 vol % of dimethyl carbonate. The current and the potential of the electrolyte solutions are measured with an electrochemical measurement system of Toyo Corporation (SI1280B), and platinum is used for a working electrode, and lithium foil is used for a counter electrode and a reference electrode. Moreover, the sweep rate of the working electrode potential is 1 mV/sec.

As shown in FIG. 3, it is evident that when $LiB(C_2O_4)_2$ is used, the oxidation potential declines, and when 4-fluoroethylene carbonate is used, the oxidation potential is increased. In other words, when the first electrolyte salt is added, a coating is formed on the anode 22, thereby the cycle characteristics can be improved; however, the oxidation potential declines, thereby an oxidation-decomposition reaction of the electrolyte solution occurs in the cathode 21. Therefore, it is difficult to significantly improve the cycle characteristics. However, when a carbonate derivative containing a halogen atom is added, the oxidation potential of the electrolyte solution is increased, and an oxidation-decomposition reaction of the electrolyte solution in the cathode 21 can be prevented, so it can be considered that the cycle characteristics can be remarkably improved by synergy of both excellent characteristics.

The solvent may include only a carbonate derivative containing a halogen atom; however, a mixture including the carbonate derivative containing a halogen atom and one or two or more kinds of other solvents is preferably used, because higher characteristics can be obtained. Examples of the other solvents include propylene carbonate, ethylene carbonate, vinylene carbonate, diethyl carbonate, dimethyl carbonate, 1,2-dimethoxyethane, 1,2-diethoxyethane, γ-butyrolactone, γ-valerolactone, tetrahydrofuran, 2-methyltetrahydrofuran, 1,3-dioxolane, 4-methyl-1,3-dioxolane, diethyl ether, sulfolane (tetrahydrothiophene 1,1-dioxide), methylsulfolane, acetonitrile, propionitrile, anisole, acetate, butyrate, propionate and fluorobenzene.

In the case where a mixture of the carbonate derivative containing a halogen atom and any other solvent is used, the content of the carbonate derivative containing a halogen atom in the solvent is preferably within a range of 0.1 vol % to 65 vol % inclusive, and more specifically within a range of 0.2 vol % to 60 vol % inclusive, because higher characteristics can be obtained within the range.

Instead of the electrolyte solution, a gel electrolyte may be used. The gel electrolyte is, for example, a high molecular weight compound holding an electrolyte solution. The electrolyte solution (that is, a solvent, an electrolyte salt and the like) is as described above. As the high molecular weight compound, for example, any material which can absorb the electrolyte solution to be gelatinized may be used, and as such a high molecular weight compound, for example, a fluorine-based high molecular weight compound such as polyvinylidene fluoride, or a copolymer of vinylidene fluoride and hexafluoropropylene, an ether-based high molecular weight compound such as polyethylene oxide, a cross-link including polyethylene oxide or the like, or polyacrylonitrile is cited. More specifically, in terms of stability of oxidation-reduction, the flurorine-based high molecular weight compound is preferable. The content of the first electrolyte salt in the gel electrolyte is the same as that in the electrolyte solution. In order words, the content of the first electrolyte salt in the electrolyte solution in the gel electrolyte is preferably within a range of 0.01 mol/l to less than 0.5 mol/l, and more preferably within a range of 0.05 mol/l to 0.45 mol/l inclusive.

When the secondary battery is charged, for example, lithium ions are extracted from the cathode active material layer 21B, and are inserted into the anode active material layer 22B through the electrolyte solution. When the secondary battery is discharged, for example, lithium ions are extracted from the anode active material layer 22B, and are inserted into the cathode active material layer 21B through the electrolyte solution. At this time, a stable coating is formed on the anode 22 by the first electrolyte salt so that an irreversible reaction which occurs between the anode 22 and the electrolyte solution can be prevented, and an oxidation-decomposition reaction of the electrolyte solution which occurs in the cathode 21 can be prevented by an increase in the oxidation potential of the electrolyte solution by the carbonate derivative containing a halogen atom.

The secondary battery can be manufactured through the following steps, for example.

At first, for example, the cathode material and the electrical conductor and the binder are mixed to prepare a cathode mixture, and the cathode mixture is dispersed in a solvent such as N-methyl-2-pyrrolidone to produce cathode mixture slurry. After the cathode mixture slurry is applied to the cathode current collector 21A, and is dried, the cathode active material layer 21B is formed through compression molding by a roller press or the like so as to form the cathode 21.

Next, for example, the anode material and the binder are mixed to prepare an anode mixture, then the anode mixture is dispersed in a solvent such as N-methyl-2-pyrrolidone to produce anode mixture slurry. After the anode mixture slurry is applied to the anode current collector 22A, and is dried, the anode mixture layer 22B is formed through compression molding by a roller press or the like so as to form the anode 22.

Next, the cathode lead 25 is attached to the cathode current collector 21A by welding or the like, and the anode lead 26 is attached to the anode current collector 22A by welding or the like. After that, a laminate including the cathode 21 and the anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 is sandwiched between a pair of insulating plates 12 and 13, and the spirally wound laminate is contained in the battery can 11. After the spirally wound laminate including the cathode 21 and the anode 22 is contained in the battery can 11, the electrolyte solution is injected into the battery can 11 to impregnate the separator 23 with the electrolyte solution. After that, the battery cover 14, the safety valve mechanism 15 and the positive temperature coefficient device 16 are fixed in an opened end portion of the battery can 11 through caulking by the gasket 17. Thereby, the secondary battery shown in FIG. 1 is completed.

Thus, in the embodiment, the electrolyte solution includes the first anion represented by $[B(C_iH_{2(i-2)}O_4)(C_jH_{2(j-2)}O_4)]^-$, the second anion and the carbonate derivative containing a halogen atom, so while maintaining high ionic conductivity, a stable coating can be formed on the anode 22 so that an irreversible reaction which occurs between the anode 22 and the electrolyte solution can be prevented, and an oxidation-decomposition of the electrolyte solution which occurs in the cathode 21 can be prevented through improving the oxidation potential of the electrolyte solution. Therefore, battery characteristics' such as cycle characteristics and low temperature characteristics can be improved.

In particular, when the content of the carbonate derivative containing a halogen atom in the solvent is within a range of 0.1 vol % to 65 vol % inclusive, and more specifically within a range of 0.2 vol % to 60 vol % inclusive, or when the content of the first anion in the electrolyte solution is within a range of 0.01 mol/l to less than 0.5 mol/l, and more specifically within a range of 0.05 mol/l to 0.45 mol/l inclusive, higher effects can be obtained.

EXAMPLES

Next, examples illustrative of the present invention without limitation will be described below.

Examples 1-1 Through 1-10

Figure 4:
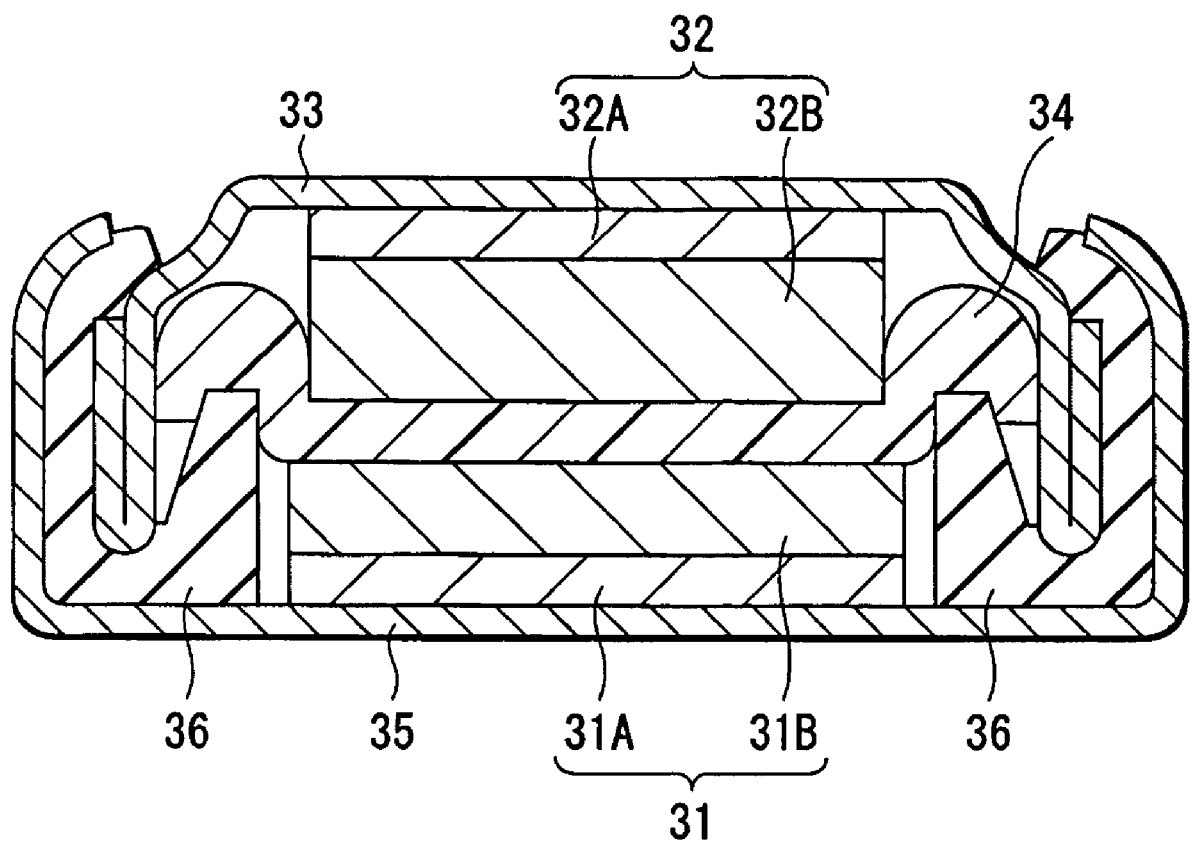
FIG. 4 is a sectional view of a secondary battery according to an example of the invention.

Coin-type secondary batteries shown in FIG. 4 were formed.

At first, after 91 parts by weight of lithium cobalt complex oxide ($LiCoO_2$) as a cathode active material, 6 parts by weight of graphite (KS-6 of Lonza) as an electrical conductor and 3 parts by weight of polyvinylidene fluoride as a binder were mixed to prepare a cathode mixture, the cathode mixture was dispersed in N-methyl-2-pyrrolidone as a solvent to form cathode mixture slurry. Next, after the cathode mixture slurry was applied to a cathode current collector 31A made of aluminum foil with a thickness of 20 μm, and was dried, the cathode mixture slurry was compression molded to form a cathode active material layer 31B. After that, the cathode current collector 31A and the cathode active material layer 31B were stamped into a pellet of 15.2 mm in diameter to form a cathode 31.

Next, 10 g of copper powder and 90 g of tin powder were mixed, and the mixture was put into a quartz boat to be heated to 1000° C. in an argon gas atmosphere, and then the mixture was left and cooled to a room temperature. A block obtained thereby was pulverized with a ball mill in an argon gas atmosphere to obtain copper-tin (Cu—Sn) alloy powder. Next, after 80 parts by weight of the copper-tin alloy powder as an anode active material, 11 parts by weight of graphite (KS-6 of Lonza) and 1 parts by weight of acetylene black as an electrical conductor and an anode active material, and 8 parts by weight of polyvinylidene fluoride as a binder were mixed to prepare an anode mixture, the anode mixture was dispersed in N-methyl-2-pyrrolidone as a solvent to form anode mixture slurry. Next, after the anode mixture slurry was applied to an anode current collector 32A made of copper foil, and was dried, the anode mixture slurry was compression molded to form an anode active material layer 32B. After that, the anode current collector 32A and the anode active material layer 32B were stamped into a pellet of 15.5 mm in diameter to form an anode 32.

Moreover, $LiB(C_2O_4)_2$ as the first electrolyte salt and $LiPF_6$ as the second electrolyte salt were added to a mixed solvent including 10 vol % of 4-fluoroethylene carbonate (FEC), 40 vol % of ethylene carbonate (EC) and 50 vol % of dimethyl carbonate (DMC) to prepare the electrolyte solution. At that time, the content of $LiB(C_2O_4)_2$ as the first electrolyte salt was changed in Examples 1-1 through 1-10 as shown in Table 1, and the content of $LiPF_6$ as the second electrolyte salt was 1.0 mol/l in all examples.

Next, the anode 32 and a separator 34 made of a microporous polypropylene film with a thickness of 30 μm were laminated in this order in a package cup 33, and the electrolyte solution was injected into the package cup 33. Then, after a package can 35 including the cathode 31 was put on the package cup 33, edge portions of the package cup 33 and the package can 35 were caulked by a gasket 36, thereby the coin-type secondary batteries with a diameter of 20 mm and a height of 2.5 mm were formed.

Moreover, as Comparative Examples 1-1 through 1-6 relative to Examples 1-1 through 1-10, secondary batteries were formed as in the case of Examples 1-1 through 1-10, except that the contents of the solvent, $LiB(C_2O_4)_2$ and $LiPF_6$ in the electrolyte solution were changed as shown in Table 1.

The cycle characteristics and the low temperature characteristics of secondary batteries of Examples 1-1 through 1-10 and Comparative Examples 1-1 through 1-6 were evaluated through the following steps. The results are shown below in Table 1.

<Cycle Characteristics>

In an environment of 25° C., the secondary batteries were charged at a constant current of 2 mA and a constant voltage until reaching an upper limit voltage of 4.2 V, and then the secondary batteries were discharged at a constant current of 2 mA until reaching an end voltage of 2.5 V. Then, 100 charge-discharge cycles were performed under the same charge-discharge conditions, and a capacity retention ratio (%) in the 100th cycle in the case where the discharge capacity in the initial cycle was 100 was determined.

<Low Temperature Characteristics>

In an environment of 25° C., the secondary batteries were charged at a constant current of 1 mA and a constant voltage until reaching an upper limit voltage of 4.2 V, and then the secondary batteries were discharged at a constant current of 1 mA until reaching an end voltage of 2.5 V. Next, after the secondary batteries were charged at a constant current of 1 mA and a constant voltage until reaching an upper limit voltage of 4.2 V in an environment of 25° C., the secondary batteries were discharged at a constant current of 1 mA until reaching an end voltage of 2.5 V in an environment of −20° C. Then, a relative capacity retention ratio determined by calculation described below was evaluated as low temperature characteristics. In other words, the low temperature characteristics was determined by a discharge capacity (mAh) at 1 mA in an environment of −20° C.÷a discharge capacity (mAh) at 1 mA in an environment of 25° C.×100. The discharge capacity was determined by a discharge capacity (mAh)=1 mA×discharge time (h).

TABLE 1

| | ANODE ACTIVE MATERIAL | $LiB(C_2O_4)_2$ (mol/l) | $LiPF_6$ (mol/l) | SOLVENT (vol %) | | | CYCLE CHARACTERISTICS (CAPACITY RETENTION RATIO) (%) | LOW TEMPERATURE CHARACTERISTICS (CAPACITY RETENTION RATIO) (%) |
|---|---|---|---|---|---|---|---|---|
| | | | | FEC | EC | DMC | | |
| EXAMPLE 1-1 | 10Cu-90Sn | 0.005 | 1 | 10 | 40 | 50 | 20 | 24 |
| EXAMPLE 1-2 | 10Cu-90Sn | 0.01 | 1 | 10 | 40 | 50 | 26 | 24 |
| EXAMPLE 1-3 | 10Cu-90Sn | 0.05 | 1 | 10 | 40 | 50 | 35 | 22 |
| EXAMPLE 1-4 | 10Cu-90Sn | 0.1 | 1 | 10 | 40 | 50 | 40 | 20 |
| EXAMPLE 1-5 | 10Cu-90Sn | 0.2 | 1 | 10 | 40 | 50 | 40 | 20 |
| EXAMPLE 1-6 | 10Cu-90Sn | 0.3 | 1 | 10 | 40 | 50 | 42 | 18 |
| EXAMPLE 1-7 | 10Cu-90Sn | 0.4 | 1 | 10 | 40 | 50 | 40 | 16 |
| EXAMPLE 1-8 | 10Cu-90Sn | 0.45 | 1 | 10 | 40 | 50 | 38 | 14 |
| EXAMPLE 1-9 | 10Cu-90Sn | 0.49 | 1 | 10 | 40 | 50 | 35 | 14 |
| EXAMPLE 1-10 | 10Cu-90Sn | 0.66 | 1 | 10 | 40 | 50 | 30 | 11 |
| COMPARATIVE EXAMPLE 1-1 | 10Cu-90Sn | — | 1 | — | 50 | 50 | 1 | 15 |
| COMPARATIVE EXAMPLE 1-2 | 10Cu-90Sn | 1 | — | — | 50 | 50 | 2 | 3 |
| COMPARATIVE EXAMPLE 1-3 | 10Cu-90Sn | 0.2 | 1 | — | 50 | 50 | 15 | 10 |
| COMPARATIVE EXAMPLE 1-4 | 10Cu-90Sn | 0.4 | 1 | — | 50 | 50 | 14 | 7 |
| COMPARATIVE EXAMPLE 1-5 | 10Cu-90Sn | — | 1 | 10 | 40 | 50 | 10 | 24 |
| COMPARATIVE EXAMPLE 1-6 | 10Cu-90Sn | — | 1 | 20 | 30 | 50 | 13 | 29 |

It is evident from Table 1 that in Examples 1-1 through 1-10 in which a mixture including the first electrolyte salt, the second electrolyte salt and 4-fluoroethylene carbonate was used, the cycle characteristics could be improved, compared to Comparative Examples 1-1 through 1-6 in which only one or two kinds selected from them were used. Although the reason was not clear, it was considered that it was because a coating by $LiB(C_2O_4)_2$ was formed on the anode 32 through adding the first electrolyte salt. Moreover, it is evident from Examples 1-1 through 1-10 that when the content of the first electrolyte salt in the electrolyte solution was increased, there were a tendency of the cycle characteristics to increase to a maximum value, and then decrease, and a tendency of the low temperature characteristics to decline. Further, it was obvious from a comparison between Examples 1-5 and 1-7 and Comparative Examples 1-3 and 1-4 that when the 4-fluoroethylene carbonate was added, the low temperature characteristics were improved.

In other words, it was found out that when the first anion represented by $B(C_2O_4)_2^-$, the second anion and the carbonate derivative containing a halogen atom were included, the cycle characteristics and the low temperature characteristics could be improved. Moreover, it was found out that the content of the first electrolyte salt or the content of the first anion in the electrolyte solution was preferably within a range of 0.01 mol/l to less than 0.5 mol/l, and more preferably within a range of 0.05 mol/l to 0.45 mol/l inclusive.

Example 2-1

A secondary battery was formed as in the case of Example 1-5, except that as the first electrolyte salt, $LiB(C_2O_4)(C_4H_4O_4)$ was used instead of $LiB(C_2O_4)_2$. The cycle characteristics and the low temperature characteristics of the secondary battery of Example 2-1 were evaluated as in the case of Example 1-5. The results are shown below in Table 2 together with the results of Example 1-5 and Comparative Examples 1-1, 1-5 and 1-6.

TABLE 2

| | ANODE ACTIVE MATERIAL | FIRST ELECTROLYTE SALT KIND | CONTENT (mol/l) | LiPF$_6$ (mol/l) | SOLVENT (vol %) FEC | EC | DMC | CYCLE CHARACTERISTICS (CAPACITY RETENTION RATIO) (%) | LOW TEMPERATURE CHARACTERISTICS (CAPACITY RETENTION RATIO) (%) |
|---|---|---|---|---|---|---|---|---|---|
| EXAMPLE 2-1 | 10Cu-90Sn | $LiB(C_2O_4)(C_4H_4O_4)$ | 0.2 | 1 | 10 | 40 | 50 | 38 | 18 |
| EXAMPLE 1-5 | 10Cu-90Sn | $LiB(C_2O_4)_2$ | 0.2 | 1 | 10 | 40 | 50 | 40 | 20 |
| COMPARATIVE EXAMPLE 1-1 | 10Cu-90Sn | — | — | 1 | — | 50 | 50 | 1 | 15 |
| COMPARATIVE EXAMPLE 1-5 | 10Cu-90Sn | — | — | 1 | 10 | 40 | 50 | 10 | 24 |
| COMPARATIVE EXAMPLE 1-6 | 10Cu-90Sn | — | — | 1 | 20 | 30 | 50 | 13 | 29 |

It is evident from Table 2 that in Example 2-1, as in the case of Example 1-5, the cycle characteristics could be improved, compared to Comparative Examples 1-1, 1-5 and 1-6. In the example, the first electrolyte salt is described referring to $LiB(C_2O_4)_2$ and $LiB(C_2O_4)(C_4H_4O_4)$; however, even if any other electrolyte salt with a structure represented by $[B(C_iH_{2(i-2)}O_4)(C_jH_{2(j-2)}O_4)]$ is used, the same effect can be obtained. In other words, it was found out that when $[B(C_iH_{2(i-2)}O_4)(C_jH_{2(j-2)}O_4)]^-$ was used as the first anion, the cycle characteristics could be improved.

Examples 3-1 through 3-9

Secondary batteries were formed as in the case of Examples 1-5 and 1-7, except that the kind and the content of the second electrolyte salt were changed as shown below in Table 3. The cycle characteristics and the low temperature characteristics of the secondary batteries of Examples 3-1 through 3-9 were evaluated as in the case of Examples 1-5 and 1-7. The results are shown in Table 3 together with the results of Examples 1-5 and 1-7 and Comparative Example 1-5.

TABLE 3

|  | ANODE ACTIVE MATERIAL | LiB(C$_2$O$_4$)$_2$ (mol/l) | SECOND ELECTROLYTE SALT KIND | CONTENT (mol/l) | SOLVENT (vol %) FEC | EC | DMC | CYCLE CHARACTER-ISTICS (CAPACITY RETENTION RATIO) (%) | LOW TEMPERATURE CHARACTER-ISTICS (CAPACITY RETENTION RATIO) (%) |
|---|---|---|---|---|---|---|---|---|---|
| EXAMPLE 1-5 | 10Cu-90Sn | 0.2 | LiPF$_6$ | 1 | 10 | 40 | 50 | 40 | 20 |
| EXAMPLE 3-1 | 10Cu-90Sn | 0.2 | LiPF$_6$ <br> LiN(CF$_3$SO$_2$)$_2$ | 0.8 <br> 0.2 | 10 | 40 | 50 | 41 | 19 |
| EXAMPLE 3-2 | 10Cu-90Sn | 0.2 | LiPF$_6$ <br> LiN(C$_2$F$_5$SO$_2$)$_2$ | 0.5 <br> 0.5 | 10 | 40 | 50 | 43 | 19 |
| EXAMPLE 3-3 | 10Cu-90Sn | 0.2 | LiPF$_6$ <br> LiBF$_4$ | 0.5 <br> 0.5 | 10 | 40 | 50 | 37 | 17 |
| EXAMPLE 1-7 | 10Cu-90Sn | 0.4 | LiPF$_6$ | 1 | 10 | 40 | 50 | 40 | 16 |
| EXAMPLE 3-4 | 10Cu-90Sn | 0.4 | LiN(CF$_3$SO$_2$)$_2$ | 0.4 | 10 | 40 | 50 | 38 | 15 |
| EXAMPLE 3-5 | 10Cu-90Sn | 0.4 | LiN(C$_2$F$_5$SO$_2$)$_2$ | 1 | 10 | 40 | 50 | 39 | 11 |
| EXAMPLE 3-6 | 10Cu-90Sn | 0.4 | LiBF$_4$ | 1 | 10 | 40 | 50 | 32 | 10 |
| EXAMPLE 3-7 | 10Cu-90Sn | 0.4 | LiClO$_4$ | 1 | 10 | 40 | 50 | 30 | 13 |
| EXAMPLE 3-8 | 10Cu-90Sn | 0.4 | LiAsF$_6$ | 1 | 10 | 40 | 50 | 26 | 10 |
| EXAMPLE 3-9 | 10Cu-90Sn | 0.4 | LiC(CF$_3$SO$_2$)$_3$ | 1 | 10 | 40 | 50 | 25 | 10 |
| COMPARATIVE EXAMPLE 1-5 | 10Cu-90Sn | — | LiPF$_6$ | 1 | 10 | 40 | 50 | 10 | 24 |

It is evident from Table 3 that in Examples 3-1 through 3-9, as in the case of Examples 1-5 and 1-7, the cycle characteristics could be improved, compared to Comparative Example 1-5. In other words, it was found out that when at least one kind selected from the group consisting of anions represented by PF$_6^-$, BF$_4^-$, N(CF$_3$SO$_2$)$_2^-$, N(C$_2$F$_5$SO$_2$)$_2^-$, ClO$_4^-$, and AsF$_6^-$ was included as the second anion, the cycle characteristics could be improved.

Example 4-1

A secondary battery was formed as in the case of Example 1-5, except that as a carbonate derivative containing a halogen atom, 4-chloroethylene carbonate shown in Chemical Formula 13 was used instead of 4-fluoroethylene carbonate. The cycle characteristics and the low temperature characteristics of the secondary battery of Example 4-1 were evaluated as in the case of Example 1-5. The results are shown below in Table 4 together with Example 1-5 and Comparative Example 1-3.

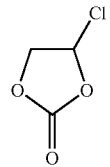

Chemical Formula 13

TABLE 4

|  | ANODE ACTIVE MATERIAL | LiB(C$_2$O$_4$)$_2$ (mol/l) | LiPF$_6$ (mol/l) | SOLVENT (vol %) FEC | CIEC | EC | DMC | CYCLE CHARACTER-ISTICS (CAPACITY RETENTION RATIO) (%) | LOW TEMPERATURE CHARACTER-ISTICS (CAPACITY RETENTION RATIO) (%) |
|---|---|---|---|---|---|---|---|---|---|
| EXAMPLE 4-1 | 10Cu-90Sn | 0.2 | 1 | 0 | 10 | 40 | 50 | 35 | 19 |
| EXAMPLE 1-5 | 10Cu-90Sn | 0.2 | 1 | 10 | 0 | 40 | 50 | 40 | 20 |
| COMPARATIVE EXAMPLE 1-3 | 10Cu-90Sn | 0.2 | 1 | 0 | 0 | 50 | 50 | 15 | 10 |

It is evident from Table 4 that in Example 4-1, as in the case of Example 1-5, the cycle characteristics could be improved, compared to Comparative Example 1-3. In other words, it was found out that even if a different material was used as a carbonate derivative containing a halogen atom, the cycle characteristics could be improved.

Examples 5-1 Through 5-10

Secondary batteries were formed as in the case of Example 1-5, except that the content of 4-fluoroethylene carbonate was changed as shown below in Table 5. The cycle characteristics and the low temperature characteristics of the secondary batteries of Examples 5-1 through 5-10 were evaluated as in the case of Example 1-5.

The results are shown in Table 5 together with the results of Examples 1-5 and Comparative Example 1-3.

Example 6-1

A secondary battery was formed as in the case of Example 1-5, except that as an anode active material, copper-silicon (Cu—Si) alloy powder was used instead of copper-tin alloy powder. The copper-silicon alloy powder was formed through the following steps. At first, 20 g of copper powder and 80 g of silicon powder as materials were mixed, then the mixture was put in a quartz boat. The mixture was heated to 1000° C.

TABLE 5

| | ANODE ACTIVE MATERIAL | $LiB(C_2O_4)_2$ (mol/l) | $LiPF_6$ (mol/l) | SOLVENT (vol %) | | | CYCLE CHARACTERISTICS (CAPACITY RETENTION RATIO) (%) | LOW TEMPERATURE CHARACTERISTICS (CAPACITY RETENTION RATIO) (%) |
|---|---|---|---|---|---|---|---|---|
| | | | | FEC | EC | DMC | | |
| EXAMPLE 5-1 | 10Cu-90Sn | 0.2 | 1 | 0.03 | 49.97 | 50 | 16 | 10 |
| EXAMPLE 5-2 | 10Cu-90Sn | 0.2 | 1 | 0.1 | 49.9 | 50 | 20 | 15 |
| EXAMPLE 5-3 | 10Cu-90Sn | 0.2 | 1 | 0.2 | 49.8 | 50 | 23 | 16 |
| EXAMPLE 5-4 | 10Cu-90Sn | 0.2 | 1 | 1 | 49 | 50 | 30 | 16 |
| EXAMPLE 5-5 | 10Cu-90Sn | 0.2 | 1 | 5 | 45 | 50 | 37 | 18 |
| EXAMPLE 1-5 | 10Cu-90Sn | 0.2 | 1 | 10 | 40 | 50 | 40 | 20 |
| EXAMPLE 5-6 | 10Cu-90Sn | 0.2 | 1 | 20 | 30 | 50 | 50 | 28 |
| EXAMPLE 5-7 | 10Cu-90Sn | 0.2 | 1 | 40 | 10 | 50 | 60 | 28 |
| EXAMPLE 5-8 | 10Cu-90Sn | 0.2 | 1 | 60 | 0 | 40 | 59 | 26 |
| EXAMPLE 5-9 | 10Cu-90Sn | 0.2 | 1 | 65 | 0 | 35 | 50 | 21 |
| EXAMPLE 5-10 | 10Cu-90Sn | 0.2 | 1 | 80 | 0 | 20 | 18 | 5 |
| COMPARATIVE EXAMPLE 1-3 | 10Cu-90Sn | 0.2 | 1 | 0 | 50 | 50 | 15 | 10 |

It is evident from Table 5 that in Examples 5-1 through 5-10, as in the case of Example 1-5, the cycle characteristics could be improved, compared to Comparative Example 1-3. Moreover, it was obvious from the results of Examples 5-1 through 5-10 that when the content of 4-fluoroethylene carbonate increased, there was a tendency of the cycle characteristics and the low temperature characteristics to increase to a maximum value, then decrease. In other words, it was found out that the content of the carbonate derivative containing a halogen atom in the solvent was preferably within a range of 0.1 vol % to 65 vol % inclusive, and more preferably within a range of 0.2 vol % to 60 vol % inclusive.

in an argon gas atmosphere, then was left and cooled to a room temperature to form a block. The obtained block was pulverized with a ball mill, thereby the copper-silicon alloy powder was formed. Moreover, as Comparative Examples 6-1 through 6-5 relative to Example 6-1, secondary batteries were formed as in the case of Example 6-1, except that the contents of $LiB(C_2O_4)_2$ and the solvent in the electrolyte solution were changed as shown in Table 6. The cycle characteristics and the low temperature characteristics of the secondary batteries of Example 6-1 and Comparative Examples 6-1 through 6-5 were evaluated as in the case of Example 1-5. The results are shown below in Table 6.

TABLE 6

| | ANODE ACTIVE MATERIAL | $LiB(C_2O_4)_2$ (mol/l) | $LiPF_6$ (mol/l) | SOLVENT (vol %) | | | CYCLE CHARACTERISTICS (CAPACITY RETENTION RATIO) (%) | LOW TEMPERATURE CHARACTERISTICS (CAPACITY RETENTION RATIO) (%) |
|---|---|---|---|---|---|---|---|---|
| | | | | FEC | EC | DMC | | |
| EXAMPLE 6-1 | 20Cu-80Si | 0.2 | 1 | 10 | 40 | 50 | 40 | 21 |
| COMPARATIVE EXAMPLE 6-1 | 20Cu-80Si | — | 1 | — | 50 | 50 | 3 | 17 |
| COMPARATIVE EXAMPLE 6-2 | 20Cu-80Si | 0.2 | 1 | — | 50 | 50 | 16 | 15 |
| COMPARATIVE EXAMPLE 6-3 | 20Cu-80Si | 0.4 | 1 | — | 50 | 50 | 14 | 8 |
| COMPARATIVE EXAMPLE 6-4 | 20Cu-80Si | — | 1 | 10 | 40 | 50 | 11 | 7 |
| COMPARATIVE EXAMPLE 6-5 | 20Cu-80Si | — | 1 | 20 | 30 | 50 | 13 | 30 |

It is evident from Table 6 that in Example 6-1, better results of the cycle characteristics and the low temperature characteristics were obtained, compared to Comparative Examples 6-1 through 6-5 in which either the first electrolyte salt or 4-fluoroethylene carbonate was used. In other words, it was found out that in the case where the anode 22 included an alloy of silicon, when the first anion, the second anion and the carbonate derivative containing a halogen atom were included in the electrolyte solution, the cycle characteristics could be improved.

Example 7-1

On the basis of the results of Examples 1-1 through 1-10, 2-1, 3-1 through 3-9, 4-1, and 5-1 through 5-10, the cycle characteristics and the low temperature characteristics of a cylindrical secondary battery having a larger capacity than the coin-type secondary battery and being shown in FIG. 1 were evaluated. In the description of the components and the manufacturing method of the secondary battery of Example 7-1, like components are donated by like numerals as in the above embodiment.

At first, a strip of aluminum foil with a thickness of 20 μm was used as the cathode current collector 21A, and after the cathode mixture slurry used in Example 1-5 was applied to both sides of the cathode current collector 21A, and was dried, the cathode mixture slurry was compression molded at a constant pressure to form the strip-shaped cathode 21.

On the other hand, a strip of copper foil with a thickness of 10 μm was used as the anode current collector 22A, and after the anode mixture slurry used in Example 1-5 was applied to both sides of the anode current collector 22A, and was dried, the anode mixture slurry was compression molded at a constant pressure to form the strip-shaped anode 22.

The cathode 21 and the anode 22 which were formed as described above were laminated with the separator 23 made of a microporous polypropylene film with a thickness of 30 μm in between to form a laminate in which the anode 22, the separator 23, the cathode 21 and the separator 23 were laminated in this order, and the laminate was spirally wound several times to form the spirally wound electrode body 20 with an outside diameter of 18 mm. The spirally wound electrode body 20 was fixed with an adhesive tape (not shown).

The spirally wound electrode body 20 was contained in the battery can 11 made of nickel-plated iron. The insulating plates 12 and 13 were disposed on the top side and the bottom side of the spirally wound electrode body 20, and the cathode lead 25 made of aluminum was drawn from the cathode current collector 21A to be welded to the battery cover 14, and the anode lead 26 made of nickel was drawn from the anode current collector 22A to be welded to the battery can 11.

Next, an electrolyte solution with the same composition as that in Example 1-5 was injected into the battery can 11. After that, the battery can 11 was caulked by the gasket 17 of which the surface was coated with asphalt to fix the safety valve mechanism 15 with a current breaking mechanism, the positive temperature coefficient device 16 and the battery cover 14, thereby hermeticity in the battery was maintained. Therefore, a cylindrical secondary battery with a diameter of 18 mm and a height of 65 mm was formed.

Moreover, as Comparative Examples 7-1 and 7-2 relative to Example 7-1, secondary batteries were formed as in the case of Examples 7-1, except that the contents of the solvent, $LiB(C_2O_4)_2$ and $LiPF_6$ in the electrolyte solution were changed as shown in Table 7.

A charge-discharge test was carried out on the secondary batteries of Example 7-1 and Comparative Examples 7-1 and 7-2 as in the case of Example 1-5, except that a current during charge and discharge was 1000 mA. Thereby the cycle characteristics and the low temperature characteristics were evaluated. The results are shown below in Table 7.

TABLE 7

| | ANODE ACTIVE MATERIAL | $LiB(C_2O_4)_2$ (mol/l) | $LiPF_6$ (mol/l) | SOLVENT (vol %) | | | CYCLE CHARACTERISTICS (CAPACITY RETENTION RATIO) (%) | LOW TEMPERATURE CHARACTERISTICS (CAPACITY RETENTION RATIO) (%) |
|---|---|---|---|---|---|---|---|---|
| | | | | FEC | EC | DMC | | |
| EXAMPLE 7-1 | 10Cu-90Sn | 0.2 | 1 | 10 | 40 | 50 | 41 | 23 |
| COMPARATIVE EXAMPLE 7-1 | 10Cu-90Sn | — | 1 | — | 50 | 50 | 1 | 17 |
| COMPARATIVE EXAMPLE 7-2 | 10Cu-90Sn | 1 | — | — | 50 | 50 | 2 | 5 |

It is evident from Table 7 that in Example 7-1 in which a mixture including the first electrolyte salt, the second electrolyte salt and the carbonate derivative containing a halogen atom was used, higher capacity retention ratios were obtained, compared to Comparative Examples 7-1 and 7-2 in which only one kind selected from them was used. In other words, it was found out that even in the cylindrical secondary battery, the same results as those in the coin-type secondary battery could be obtained.

Moreover, the amounts of the first electrolyte salt and the carbonate derivative containing a halogen atom were not dependant on the shape of a battery, so the amounts in the cylindrical secondary battery were the same as those in the coin-type secondary battery. The content of the first electrolyte salt in the electrolyte solution was preferably within a range of 0.01 mol/l to less than 0.5 mol/l, and more preferably within a range of 0.05 mol/l to 0.45 mol/l inclusive, and the content of the carbonate derivative containing a halogen atom in the total amount of the solvent was preferably within a range of 0.1 vol % to 65 vol % inclusive, and more preferably within a range of 0.2 vol % to 60 vol % inclusive.

Although the present invention is described referring to the embodiment and examples, the invention is not specifically limited to them, and is variously modified. For example, in the embodiment and the examples, the case where the electrolyte solution is used as an electrolyte is described, and in the above embodiment, the case where a gel electrolyte in which a high molecular weight compound holds an electrolyte solution is described; however, any other electrolyte may be used. Examples of the other electrolyte include a mixture of an inorganic ion conductive compound such as ion conductive ceramic, ion conductive glass or ionic crystal and an electrolyte solution, a mixture of any other organic compound and an electrolyte solution and a mixture of these organic compounds and a gel electrolyte.

Moreover, in the embodiment and the examples, the case where as the anode active material, simple substances, alloys and compounds of metal elements and metalloid elements capable of inserting and extracting lithium are used is described; however, instead of them, the case where a carbon material or lithium metal is used as an anode active material can be applied to the invention.

Further, in the embodiment and the examples, the secondary battery using lithium as an electrode reacting material is described; however, the case where any other alkali metal such as sodium (Na) or potassium (K), alkali earth metal such as magnesium or calcium (Ca) or other light metal such as aluminum is used as an electrode reacting material can be applied to the invention. In this case, as described above, in the anode, at least one kind selected from the group consisting of simple substances, alloy and compounds of metal elements capable of inserting and extracting the light metal and simple substances, alloys and compounds of metalloid elements capable of inserting and extracting the light metal can be used as an anode active material, and the anode can be formed such that the capacity of the anode includes a capacity component by insertion and extraction of the light metal. Further, as the anode active material, a carbon material or the light metal may be used.

In addition, in the embodiment and the examples, the cylindrical secondary battery is described, and in the example, the coin-type secondary battery is described; however, the invention can be applied to a battery with any other shape such as a button shape, a prismatic shape or a battery using a package member such as a laminate film, or a secondary battery with any other structure such as a laminate structure in a like manner. Further, the invention is applicable to not only the secondary batteries but also any other battery such as primary batteries.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electrolyte solution in contact with an anode, comprising:
a solvent including a carbonate derivative containing a halogen atom 4-fluoroethylene carbonate, wherein a content of the carbonate derivative in the solvent ranges from about greater than 10 vol % to about 65 vol %;
a first anion represented by a formula:

[B(C$_i$H$_{2(i-2)}$O$_4$)(C$_j$H$_{2(j-2)}$O$_4$)]— where i and j are integers of two or more; and
a second anion except for the first anion,
and wherein the anode includes a noncarbonaceous anode active material capable of inserting and extracting an electrode reacting material, and the noncarbonaceous anode active material is selected from the group consisting of a silicon-copper alloy and a tin-copper alloy.

2. An electrolyte solution according to claim 1, wherein the first anion includes B(C$_2$O$_4$)$_2$—.

3. An electrolyte solution according to claim 1, wherein a content of the first anion in the electrolyte solution ranges from about 0.01 mol/l to less than about 0.5 mol/l.

4. An electrolyte solution according to claim 1, wherein the second anion is selected from the group consisting of PF$_6$—, BF$_4$—, ClO$_4$—, AsF$_6$—, [N(C$_m$F$_{2m+1}$SO$_2$)(C$_n$F$_{2n+1}$SO$_2$)]— where m and n are integers of one or more,
[C(C$_p$F$_{2p+1}$SO$_2$)(C$_q$F$_{2q+1}$SO$_2$)(C$_r$F$_{2r+1}$SO$_2$)]— where p, q and r are integers of one or more, and combinations thereof.

5. A battery, comprising:
a cathode;
an anode; and
an electrolyte solution,
wherein
the anode includes a noncarbonaceous anode active material capable of inserting and extracting an electrode reacting material, and the noncarbonaceous anode active material is selected from the group consisting of silicon-copper alloy and a tin-copper alloy, and
the electrolyte solution comprises:
a solvent including a carbonate derivative containing a halogen atom 4-fluoroethylene carbonate, wherein a content of the carbonate derivative in the solvent ranges from about greater than 10 vol % to about 65 vol %;
a first anion represented by a formula:

[B(C$_i$H$_{2(i-2)}$O$_4$)(C$_j$H$_{2(j-2)}$O$_4$)]— where i and j are integers of 2 or more; and
a second anion except for the first anion.

6. A battery according to claim 5, wherein the first anion includes B(C$_2$O$_4$)$_2$—.

7. A battery according to claim 5, wherein a content of the first anion in the electrolyte solution ranges from about 0.01 mol/l to less than about 0.5 mol/l.

8. A battery according to claim 5, wherein the second anion is selected from the group consisting of PF$_6$—, BF$_4$—, ClO$_4$—, AsF$_6$—,
[N(C$_m$F$_{2m+1}$SO$_2$)(C$_n$F$_{2n+1}$SO$_2$)]— where m and n are integers of one or more,
[C(C$_p$F$_{2p+1}$SO$_2$)(C$_q$F$_{2q+1}$SO$_2$)(C$_r$F$_{2r}$+1SO$_2$)]—,where p, q and r are integers of one or more, and combinations thereof.

9. The electrolyte solution according to claim 1, wherein the content of 4-fluoroethylene carbonate in the solvent is greater than 20 vol %.

10. The electrolyte solution according to claim 1, wherein the content of 4-fluoroethylene carbonate in the solvent ranges from about 20 vol % to about 40 vol %.

11. The battery according to claim 5, wherein the content of 4-fluoroethylene carbonate in the solvent is greater than 20 vol %.

12. The battery according to claim 5, wherein the content of 4-fluoroethylene carbonate in the solvent ranges from about 20 vol % to about 40 vol %.

13. The electrolyte solution according to claim 1, wherein the anode further comprises a second anode active material, the second anode active material is a carbon material.

14. The battery according to claim 5, wherein the anode further comprises a second anode active material, the second anode active material is a carbon material.

* * * * *